United States Patent
Shimizu et al.

(10) Patent No.: US 6,309,720 B1
(45) Date of Patent: Oct. 30, 2001

(54) POLYESTER LAMINATE FILM, METAL PLATE LAMINATED WITH THIS FILM AND FILM-LAMINATED METAL CONTAINER

(75) Inventors: Hideki Shimizu; Hiroshi Nagano; Tsutomu Oko; Hideki Igushi, all of Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/664,772

(22) Filed: Sep. 19, 2000

Related U.S. Application Data

(62) Division of application No. 09/226,074, filed on Jan. 6, 1999, now Pat. No. 6,277,455.

(30) Foreign Application Priority Data

Jan. 6, 1998 (JP) ....................................... 10-1065
Jan. 6, 1998 (JP) ....................................... 10-1066

(51) Int. Cl.[7] .......................... B32B 15/08; B32B 27/08; B32B 27/36
(52) U.S. Cl. ....................... 428/35.9; 428/35.7; 428/35.8; 428/212; 428/457; 428/458; 428/480; 428/910
(58) Field of Search .................................. 428/35.7, 35.8, 428/35.9, 212, 457, 458, 480, 910

(56) References Cited

FOREIGN PATENT DOCUMENTS

| | | |
|---|---|---|
| 0 638 412 A1 | 2/1995 | (EP) . |
| 0 798 109 A1 | 10/1997 | (EP) . |
| 7-1693 | 1/1995 | (JP) . |
| 7-1694 | 1/1995 | (JP) . |
| 07227946A | 8/1995 | (JP) . |
| 09-277476 * | 10/1997 | (JP) . |

\* cited by examiner

Primary Examiner—Vivian Chen
(74) Attorney, Agent, or Firm—Morrison & Foerster LLP

(57) ABSTRACT

A polyester laminate film comprising plural polyester layers, which comprises one surface layer comprising a polyester and a lubricant having an average particle size of 1–3 μm in a proportion of 1–5 wt % and the other surface layer comprising a polyester wherein 5–15 mol % of the entire acid component is a dimer acid component, the polyester laminate film having a crystallization peak temperature of 80–120° C. under temperature rise of the On The polyester laminate film of the present invention has a lower crystallization peak temperature when the film is under temperature rise, as compared to conventional polyethylene terephthalate. As a consequence, the film is free of whitening upon retorting, even after the film was subjected to remelting treatment and rapid cooling for noncystallization and unorienting. Therefore, the film serves well as a laminate film for food containers and beverage cans that undergo retort sterilization. Inasmuch as the polyester layer on one surface contains a large amount of a lubricant and has releasing property, the film serves well as a laminate film for a metal plate, which is required to have releasing property from a mold during manufacture of containers such as a two-piece can. The polyester layer on the other surface contains a large amount of dimer acid and the film is superior in impact resistance. Hence, the film serves well as a laminate film for a metal container which is susceptible to damage due to impact during distribution process.

12 Claims, No Drawings

POLYESTER LAMINATE FILM, METAL PLATE LAMINATED WITH THIS FILM AND FILM-LAMINATED METAL CONTAINER

The present application is a division of U.S. application Ser. No. 09/226,074 filing date Jan. 6, 1999, now U.S. Pat. No. 6,277,455.

TECHNICAL FIELD OF THE INVENTION

The present invention relates to a polyester laminate film to be laminated on a metal material for food cans and beverage cans for soft drinks, beer and the like, a metal plate that has been laminated with said film and a film-laminated metal container obtained by forming said plate. More particularly, the present invention relates to a polyester laminate film particularly suitable for inner and outer walls of a two-piece can, a metal plate that has been laminated with this film and a film-laminated metal container obtained by forming said plate.

BACKGROUND OF THE INVENTION

In a known method for the prevention of corrosion, a thermoplastic film is laminated on the inner wall and outer wall of a metal can. For example, Japanese Patent Unexamined Publication No. 7-227946 discloses a polyester film to be laminated on a metal material for food cans. This polyester film is superior in scratch resistance, and a metal plate laminated with this film (hereinafer to be referred to as a film-laminated metal plate) is free of degradation of a product value due to the occurrence of scratches on the film surface in, for example, a can manufacture step comprising forming a metal plate into a cylindrical shape and seaming lids on the upper and lower openings of this cylinder, when the film-laminated metal plate is delivered or subjected to seaming.

The above-mentioned polyester film is superior in resistance to seaming and associated with less elution of oligomer from the film during heat treatment such as retorting applied after can manufacture and packing food therein. Consequently, this film serves well as a film to be applied to the inner wall of a metal container.

Cans for soft drinks include a so-called three-piece can wherein lids are set on the upper and lower openings of a cylinder formed using a metal plate, and a so-called two-piece can wherein a metal plate is drawn deep to form a container part and a lid is seamed onto the upper opening of this container part.

In the case of a three-piece can, a film-laminated metal plate is formed into a cylindrical shape, but in the case of a two-piece can, a film-laminated metal plate undergoes a draw-wipe forming.

Consequently, the film to be laminated on a metal plate that is used to make a two-piece can is required to have superior moldability that allows the film to be molded following the shape change of the metal plate. At the same time, the film is required to show superior adhesion to the metal plate. When the film has insufficient moldability or poor adhesion to the metal plate, the film may come off from the metal plate (i.e., delamination) or the film may be broken during manufacture of the container part of a two-piece can.

A film-laminated metal plate is formed into the container part of a two-piece can by repeated ascending and descending of a punch used for drawing. Therefore, the film constituting the inner wall of the container is required to be easily releasable from the punch.

Moreover, the film constituting the outer wall of the container is required to be free of whitening or precipitation of oligomer due to heat treatment for retorting or printing, which is applied after can manufacture including drawing and wiping.

SUMMARY OF THE INVENTION

It is therefore an object of the present invention to provide a polyester laminate film superior in adhesion to a metal plate, moldability, releasing property, resistance to heat treatment and strength, that can be applied as a laminate film for a metal plate to be used for manufacture of two-piece cans; a metal plate that has been laminated with this film; and a film-laminated metal container obtained by forming this metal plate.

The present invention provides two aspects as represented by the following (1)–(8) and (9)–(16).

(1) A polyester laminate film comprising plural polyester layers, which comprises one surface layer comprising a polyester and a lubricant having an average particle size of 1–3 µm in a proportion of 1–5 wt % and the other surface layer comprising a polyester, wherein 5–15 mol % of the entire acid component is a dimer acid component, the polyester laminate film having a crystallization peak temperature of 80–120° C. under temperature rise of the film.

(2) The polyester laminate film of (1) above, which has been biaxially oriented.

(3) A film-laminated metal plate comprising a metal plate and the polyester laminate film of (1) or (2) above laminated on the metal plate in such a manner that said other surface layer of the film is in contact with the metal plate.

(4) The film-laminated metal plate of (3) above, wherein the film is obtained by rapid cooling after heat treatment, so that the film is substantially noncrystalline and unoriented.

(5) A film-laminated metal container comprising a metal container and the polyester laminate film of (1) or (2) above, said film being laminated on the inner wall of the metal container in such a manner that said other surface layer of the film is in contact with the metal container.

(6) A film-laminated metal container obtained by forming the film-laminated metal plate of (3) or (4) above in such a manner that the film constitutes an inner wall of the film-laminated metal container.

(7) The film-laminated metal container of (5) or (6) above, wherein the film is obtained by rapid cooling after heat treatment, so that the film is substantial noncrystalline and unoriented.

(8) The film-laminated metal container of any of (5)–(7) above, which is a two-piece can.

(9) A polyester laminate film comprising plural polyester layers, which comprises one polyester surface layer having a melting peak temperature of 200–260° C. and a crystallization peak temperature of 60–100° C. under temperature rise of the layer, and the other polyester surface layer having a melting peak temperature of 180–240° C. and a crystallization peak temperature of 60–100° C. under temperature rise of the layer, wherein the melting peak temperature of said one polyester surface layer is higher by 5–25° C. than the melting peak temperature of said other polyester surface layer.

(10) The polyester laminate film of (9) above, which has been biaxially oriented.

(11) A film-laminated metal plate comprising a metal plate and the polyester laminate film of (9) or (10) above laminated on the metal plate in such a manner that said other surface layer of the film is in contact with the metal plate.

(12) The film-laminated metal plate of (11) above, wherein the film is obtained by rapid cooling after heat treatment, so that the film is substantially noncrystalline and unoriented.

(13) A film-laminated metal container comprising a metal container and the polyester laminate film of (9) or (10) above, said film being laminated on the outer wall of the metal container in such a manner that said other surface layer of the film is in contact with the metal container.

(14) A film-laminated metal container obtained by forming the film-laminated metal plate of (11) or (12) above in such a manner that the film constitutes an outer wall of the film-laminated metal container.

(15) The film-laminated metal container of (13) or (14) above, wherein the film is obtained by rapid cooling after heat treatment, so that the film is substantial noncrystalline and unoriented.

(16) The film-laminated metal container of any of (13)–(15) above, which is a two-piece can.

DETAILED DESCRIPTION OF THE INVENTION

The first embodiment of the present invention is described in detail in the following.

The polyester laminate film of the present invention comprises the following specific polyester layers constituting the surface layers.

The polyester layer on one side of the inventive polyester laminate film (hereinafter this polyester layer is to be briefly referred to as polyester layer A) is explained in the following. This layer is not brought into contact with the metal plate.

The polyester layer A is made from a polyester composition A containing a polyester and a lubricant having an average particle size of 1–3 $\mu$m in a proportion of 1–5 wt %. When compared to the typical lubricant content (0.05–0.2 wt %) of conventional polyester films, the lubricant content of the polyester composition A is rather high. This is because a film-laminated metal plate obtained by laminating the inventive film on a metal plate requires 1 wt % or more of a lubricant to ensure releasing property of the film from a punch during drawing. A lubricant in an amount exceeding 5 wt % does not enhance releasing property and is economically disadvantageous. The lubricant content is preferably 1–3 wt %, more preferably 1–2 wt %.

The average particle size of the lubricant is 1–3 $\mu$m, preferably 1–2.5 $\mu$m, and more preferably 1–2 $\mu$m. When it is less than 1 $\mu$m, the releasing property of the film from a punch cannot be improved. A lubricant having the average particle size exceeding 3 $\mu$m leads to disadvantageous effects that the releasing property of the film from a punch reaches saturation, the lubricant easily drops due to abrasion, and the film may become broken during lamination on a metal plate.

The lubricants to be used in the present invention are preferably inert inorganic particles and crosslinked polymer particles. Examples of the inert inorganic particles include silica, alumina, kaoline, clay, titanium oxide, calcium phosphate, calcium carbonate, lithium fluoride, barium sulfate, carbon black and the like. The crosslinked polymer particles are subject to no particular limitation as long as they have heat resistance to endure the temperature during melt-forming of polyester. For example, they may be obtained by addition polymerization, condensation polymerization, polyaddition and the like. The crosslinked polymer particles obtained by addition polymerization may be obtained from a copolymer of a monomer such as acrylic monomer (e.g., acrylic acid, methacrylic acid, acrylate and the like), styrene monomer (e.g., styrene, alkyl substituted styrene and the like) and the like, and a crosslinking monomer (e.g., divinyl benzene, divinyl sulfone, ethylene glycol dimethacrylate, trimethylolpropane trimethacrylate, pentaerythritol tetramethacrylate and the like). The crosslinked polymer particles obtained by condensation polymerization or polyaddition include those of melamine resin, benzoguanamine resin, phenol resin, silicone resin and the like. Of these, crosslinked polymer particles obtained from a copolymer of acrylic monomer and/or styrene monomer and crosslinking monomer are particularly preferable. The method for producing these crosslinked polymer particles is not particularly limited and may be emulsion polymerization, suspension polymerization and the like. The particle size and particle size distribution of the aforementioned crosslinked polymer may be adjusted by pulverization, classification and the like.

This lubricant may be used alone or in combination. The method for adding said lubricant to polyester composition A is not particularly limited. For example, it may be added during synthesis of polyester, preparation of the composition comprising polyester and other additives, or formation of the layer by extrusion of the composition from an extruder. A master batch containing the lubricant may be prepared in advance and added.

The polyester composition A has a cyclic trimer (e.g., ethylene terephthalate cyclic trimer) content of preferably not more than 0.7 wt %, more preferably not more than 0.6 wt %, and particularly preferably not more than 0.5 wt %. The cyclic trimer content of preferably not more than 0.7 wt % aims at suppressing the possible precipitation of oligomer in the firm. As mentioned later, when a two-piece can is to be produced, a film-laminated metal plate comprising the inventive film is subjected to a remelting treatment to make the film unoriented. An unoriented polyester is more prone to precipitation of oligomer than an oriented polyester. When the unoriented polyester has a high cyclic trimer content and when a two-piece can having this film on the inner wall is filled with a beverage and subjected to heat treatment such as retorting, the oligomer elutes out easily. The eluted oligomer mites into the beverage and degrades the taste and flavor of the content. In addition, a can having this film on the outer wall loses superior appearance when the oligomer precipitates in the polyester layer A.

The cyclic trimer (e.g., ethylene terephthalate cyclic trimer) content of the polyester composition A is set to 0.7 wt % or less by any method. For example, it may be extracted with water or an organic solvent from a film comprising the polyester layer A. Alternatively, polyester layer A may be formed from a polyester containing less cyclic trimer. Of these, the latter is economically beneficial.

In this latter method, the polyester containing less cyclic trimer may be produced by any method. For example, solid phase polymerization; heat treatment under reduced pressure or extraction with water or an organic solvent after polymerization; a method combining these methods; and the like may be applied. Particularly preferable method comprises producing a polyester containing less cyclic trimer by solid phase polymerization and extracting the resulting polyester with water to reduce cyclic trimer. This method most effectively inhibits production of cyclic trimer during a film forming process.

The polyester to be contained in the polyester composition A is not particularly limited. Preferred are polyethylene terephthalate copolymer and polybutyrene terephthalate copolymer.

Other copolymer components constituting the polyester include dicarboxylic acid component such as isophthalic acid, p-β-oxyethoxybenzoic acid, 2,6-naphthalene dicarboxylic acid, 4,4'-dicarboxydiphenyl, 4,4'-carboxybenzophenone, bis(4-carboxyphenyl)ethane, adipic add, sebacic acid, 5-sodium sulfoisophthalate, cyclohexane-1,4-dicarboxylic acid, dimer acid and the like; glycol component such as propylene glycol, butanediol, neopentyl glycol, diethylene glycol, cyclohexane dimethanol, ethylene oxide adduct of bisphenol A, polyethylene glycol, polypropylene glycol, polytetramethylene glycol and the like; and oxycarboxylic acid component such as p-oxybenzoic acid. Other copolymerizable components include a compound having amide bond, urethane bond, ether bond, carbonate bond and the like in small amounts.

The above-mentioned polyester can be synthesized by a conventional method such as direct esterification wherein dicarboxylic acid and glycol are directly reacted; ester exchange wherein dimethyl dicarboxylate and glycol are reacted; and the like. These methods may be batch-wise or continuous. Alternatively, solid phase polymerization may be used to increase molecular weight. The solid phase polymerization is advantageous in reducing the cyclic trimer content, as mentioned above. One or more kinds of the polyester(s) synthesized in this way may be added to the polyester composition A.

The above-mentioned polyester composition A contains the above-mentioned polyester, lubricant and, where necessary, other additives such as inorganic fine particles, incompatible thermoplastic resin, antioxidant, heat stabilizer, ultraviolet absorber, plasticizer, pigment, antistatic, crystal nucleating agent and the like. When the inventive film is used for an outer wall of a metal container, an antioxidant is preferably added to the polyester composition A in a proportion of 0.01–1 wt %.

When the above-mentioned various components are mixed, the polyester composition A preferably has an intrinsic viscosity of 0.6–1.2. When the polyester composition A has an intrinsic viscosity of less than 0.6, the obtained film may have poor mechanical properties and when the intrinsic viscosity exceeds 1.2, the film has excessive quality and the productivity of the starting polyester decreases, which is economically harmful. In the present invention, the intrinsic viscosity was measured by a method described below.

The polyester layer A made from the above composition has a crystallization peak temperature under temperature rise of the layer of preferably 80–120° C. This aims at setting the crystallization peak temperature of the entire film under temperature rise to 80–120° C. For the crystallization peak temperature of the polyester layer A under temperature rise to be in the above-mentioned range, one or more suitable polyesters may be added from among those to be added to the polyester composition A, to achieve the desired crystallization peak temperature, or a polyester containing specific polymerizable components may be added to achieve the desired crystallization peak temperature. In the present invention, crystallization peak temperature under temperature rise is measured by a method described below.

The polyester layer on the other side of the inventive polyester laminate film (hereinafter this polyester layer is to be briefly referred to as polyester layer B) is explained in the following. This layer is brought into contact with the metal plate.

The polyester layer B is made from a polyester composition B containing a polyester comprising a dimer acid component in a proportion of 5–15 mol %, preferably 7–13 mol %, and more preferably 8–12 mol %, of the entire acid component.

The dimer acid is added as a polymerizable component of a polyester to improve impact resistance of a film. The amount thereof of less than 5 mol % results in breakage and flaw of the film, due to an impact exerted from outside during distribution of a film-laminated metal plate and a metal container formed from said film. When the amount exceeds 15 mol %, heat resistance and strength of the film may be degraded. The impact resistance may be improved by addition of dimer acid not only to polyester layer B but also to polyester layer A. In the case of a film-laminated metal container formed from a film-laminated metal plate and having the film constituting the inner wall of the container, polyester layer A of the film to be in contact with the content (e.g., food) of the container preferably does not contain a large amount of dimer acid as a polymerizable component. This is because the dimer acid may affect taste and flavor of the content. The impact resistance of the film as a whole can be improved as long as at least one of polyester layer B to be in contact with the metal plate and polyester layer A free from contact with the metal plate has an enhanced impact resistance.

The dimer acid can be obtained by dimerization of unsaturated higher fatty acid such as oleic acid and the like and generally has an unsaturated bond in a molecule. It may have a lower unsaturation degree upon hydrogenation. Hydrogenated dimer acid is more preferable, since the film has improved heat resistance and flexibility. In the dimerization step, a linear or branched structure, alicyclic structure or aromatic nucleus structure is formed, but the structure and amount thereof are subject to no particular limitation.

The polyester to be added to polyester composition B contains the aforementioned dimer acid as a polymerizable component in a proportion of 5–15 mol % of the entire acid component. The glycol component and dicarboxylic acid component other than dimer acid are subject to no particular limitation. The dicarboxylic acid component can be optionally selected from, for example, terephthalic acid, isophthalic acid, p-β-oxyethoxybenzoic acid, 2,6-naphthalene dicarboxylic acid, 4,4'-dicarboxydiphenyl, 4,4'-dicarboxybenzophenone, bis(4-carboxyphenyl)ethane, adipic acid, sebacic acid, 5-sodium sulfoisophthalate, cyclohexane-1,4-dicarboxylic acid and the like, with preference given to terephthalic acid. The glycol component may be, for example, ethylene glycol, propylene glycol, butanediol, neopentyl glycol, diethylene glycol, cyclohexane dimethanol, ethylene oxide adduct of bisphenol A, polyethylene glycol, polypropylene glycol, polytetramethylene glycol and the like, with preference given to ethylene glycol. The copolymerizable components other than the above include oxycarboxylic acid component such as p-oxybenzoic acid and a compound having amide bond, urethane bond, ether bond, carbonate bond and the Like in small amounts.

The synthetic method of the above-mentioned polyester, additives for polyester composition B to be added on demand, intrinsic viscosity of polyester composition B, and the like may be those described above with regard to polyester composition A.

The polyester layer B consisting of the above composition has a crystallization peak temperature of preferably 80–120°

C. when the layer is under temperature rise. This aims at setting the crystallization peak temperature of the entire film to 80–120° C. when the film is under temperature rise. For the crystallization peak temperature of the polyester layer B under temperature rise to be in the above-mentioned range, one or more suitable polyesters may be added from among those to be added to the polyester composition B, to achieve the desired crystallization peak temperature, or a polyester containing specific polymerizable components may be added to achieve the desired crystallization peak temperature.

In the inventive polyester laminate film, polyester layer A preferably has a thickness of 3–20 μm and polyester layer B preferably has a thickness of 3–20 μm. When the polyester layer A has a thickness of less than 3 μm, the film cannot show sufficient releasing property from a punch during drawing and the like. When the polyester layer B has a thickness of less than 3 μm, the film cannot show sufficiently high impact resistance. The film as a whole preferably has a thickness of 10–40 μm.

The inventive film need only be a laminate wherein one surface layer is the polyester layer A, and the other surface layer is the polyester layer B. It may not have a two-layer structure. Polyester layers having similar compositions to the polyester layer A and the polyester layer B, or different compositions may be further formed between the polyester layer A and the polyester layer B to give a multi-layer structure. The laminating method is subject to no particular limitation and multi-layer extrusion or excursion lamination may be employed.

The film of the present invention has a crystallization peak temperature of the film as a whole of 80–120° C. when the film is under temperature rise. When the crystallization peak temperature of the film under temperature rise is 80–120° C., whitening of the film and generation of white spots on the film after retorting can be inhibited. This is because the crystallization peak temperature is lower than the crystallization temperature (150–170° C.) of conventional polyethylene terephthalate. Hence, even when said film is laminated on a metal plate and subjected to remelting treatment to make said film substantially unoriented, the film upon retorting after can manufacture shows rapid crystallization of polyester, wherein fine crystals may be generated but bully crystals are not. When the crystallization peak temperature of the film under temperature rise is less than 80° C., film forming property becomes harmfully low. For the crystallization peak temperature of the film as a whole to be within the aforementioned range when the film is under temperature rise, the crystallization peak temperatures of polyester layer A and polyester layer B under temperature rise are set to fall within 80–120° C.

The film of the present invention may be a biaxially oriented film or unoriented film. The method for biaxial orientation here may be sequential biaxial orientations, simultaneous biaxial orientation, or a combination of the both. The sequential biaxial orientation typically employs longitudinal orientation and then transverse orientation, but the order may be reversed. After biaxial orientation, heat treatment is preferably applied to fix the orientation of the polyester. After biaxial orientation and before heat treatment, drawing may be applied again in the longitudinal direction and/or transverse direction. In addition, corona discharge treatment or predetermined coating may be applied to one or both sides of a film, before or after drawing.

The film of the present invention preferably shows shrink performance of the film as a whole of 0–3 g/4 mm. A biaxially oriented film also preferably shows shrink performance in this range. When the shrink performance that the film potentially shows is high and the film is used to give a film-laminated metal plate, the film may shrink to cause delamination upon remelting treatment, or, when adhesion of polyester layer B to metal plate is sufficient, only the polyester layer A, which does not come into contact with the metal plate, may be dislocated (i.e., film deviation).

The shrink performance of a film is made to fall within the aforementioned range by heat treatment while relaxing the film (for fixing orientation after drawing) at (melting peak temperature −20)° C. in a film forming process. In the present invention, the shrink performance of a film is measured by the method to be mentioned later.

The film-laminated metal plate of the present invention comprises a metal plate and the inventive film laminated on the metal plate in such a manner that the polyester layer B comes into contact with the metal plate. The polyester layer A having releasing property constitutes the surface layer of the film-laminated metal plate. As a result, the film shows releasing property from a punch during drawing.

The film can be laminated on a metal plate by any method. For example, dry lamination, thermal lamination and the like may be employed. To be specific, the polyester layer B of the film is placed on a metal plate heated to a temperature at which the polyester layer B melts. The plate with the film is passed through a nip roll in this state to allow the polyester layer B to melt. Then, the film is rapidly cooled at 10–40° C. to cure and to be laminated on the metal plate. After passage through a nip roll, the film may be heat treated as necessary at a temperature at which the polyester layer B melts.

The film may be laminated only on one surface of the metal plate or both. For lamination on both sides, simultaneous or successive lamination may be applied.

When the film-laminated metal plate of the present invention is to be formed into a two-piece can, the film is laminated on a metal plate, heated to a temperature not less than the melting point of the polyester constituting the film, and rapidly cooled to remove orientation of the polyester (remelting treatment). The orientation degree of the polyester in the film after remelting treatment by X-ray observation becomes not more than 10%, and the film is substantially unoriented. A biaxially oriented film comprising an oriented polyester does not deform or stretch easily. Hence, when the film laminated on a metal plate is a biaxially oriented film, the drawing step for forming a container part from the film-laminated metal plate becomes difficult. In a worst imaginable case, the film may be peeled off from the metal plate (delamination) or broken or scraped off during draw-wipe forming. When the film laminated on the metal plate is substantially unoriented, the film can follow deformation of the metal plate, so that the film is free of delamination or breakage. The film is therefore applicable to molding that accompanies plastic deformation of a metal, such as manufacture of a two-piece can.

An unoriented film generally has lower strength and is susceptible to precipitation of oligomer and whitening, as compared to biaxially oriented films. However, the unoriented film of the present invention has sufficient strength free from breakage or scratch and is free of precipitation of oligomer and whitening.

The film-laminated metal container of the present invention is obtained by appropriately forming the above-mentioned film-laminated metal plate comprising an unoriented film. The shape of the container and the method for forming same are subject to no particular limitation. Specifically, the container may be a so-called three-piece can obtained by forming the film-laminated metal plate into a cylindrical shape and seaming lids on the upper and lower openings of this cylinder, or a two-piece can obtained by drawing the film-laminated metal plate to form a container part and seaming a lid onto the upper opening of this container.

With respect to the film-laminated metal container of the present invention, the film-laminated metal plate may be so formed as to make the film constitute the inner wall or outer wall of the container. In the case of a two-piece can, however, the film-laminated metal plate is preferably formed in such a manner that the film constitutes the inner wall, so that the polyester layer A superior in releasing property comes into contact with a punch and appropriate drawing is performed. In the case of draw-wipe forming, the film surface to be in contact with the punch may be coated with a lubricant as necessary. When a lubricant is applied, the lubricant needs to be removed by evaporation, washing and the like after forming.

In the film-laminated metal container of the present invention, moreover, the film constituting the barrel part of the container has been monoaxially oriented in the longitudinal direction, due to drawing for forming the container, even when a film-laminated metal plate comprising an unoriented film after remelting treatment is used.

The film-laminated metal container of the present invention may be printed as necessary. When printed, the same effect as achieved by remelting treatment can be afforded by baking of the ink. Therefore, orientation that occurred due to draw-wipe forming, as evidenced in the barrel part of a two-piece can, can be eliminated and the film can be restored to the unoriented state after the printing step.

When the film is oriented like a two-piece can immediately after drawing, a remelting treatment by printing and the like is preferably applied. The film-laminated metal container preferably has a polyester orientation degree of the film of not more than 10% by an X-ray observation.

The second embodiment of the present invention is described in detail in the following.

The polyester laminate film of the present invention comprises the following specific polyester layers constituting the surface layers.

The polyester layer on one side of the inventive polyester laminate film (hereinafter this polyester layer is to be briefly referred to as polyester layer C) is explained in the following. This layer is not brought into contact with the metal plate.

The polyester layer C has a melting peak temperature of 200–260° C. and a crystallization peak temperature of 60–100° C. when the layer is under temperature rise, and consists of a polyester composition C.

The melting peak temperature of 200–260° C. aims at preventing the polyester layer C from melting during lamination with a metal to be mentioned liter. The melting peak temperature is preferably 210–250° C., more preferably 220–240° C.

The polyester layer C has a crystallization peak temperature under temperature rise of 60–100° C. When the crystallization peak temperature of the layer under temperature rise is 60–100° C., whitening of the film and generation of white spots on the film after retorting can be inhibited. This is because the crystallization peak temperature is lower than the crystallization temperature (150–170° C.) of conventional polyethylene terephthalate. Hence, even when said film is laminated on a metal plate and subjected to remelting treatment to make said film substantially unoriented, the film upon retorting after can manufacture shows rapid crystallization of polyester, wherein fine crystals may be generated but bulky crystals are not When the crystallization peak temperature of the layer under temperature rise is less than 80° C., film forming property becomes harmfully low.

For the melting peak temperature and crystallization peak temperature under temperature rise of the polyester layer C to be within the above-mentioned ranges, one or more suitable polyesters may be added from among those to be added to the polyester composition C, to achieve the desired melting peak temperature and crystallization peak temperature, or a polyester containing specific polymerizable components may be added to achieve the desired crystallization peak temperature. In the present invention, the melting peak temperature and crystallization peak temperature of the layer under temperature rise are measured by a method described below.

The polyester to be contained in the polyester composition C is not particularly limited. Preferred are polyethylene terephthalate copolymer and polybutyrene terephthalate copolymer.

Other copolymer components constituting the polyester include dicarboxylic acid component such as isophthalic acid, p-β-oxyethoxybenzoic acid, 2,6-naphthalene dicarboxylic acid, 4,4'-dicarboxydiphenyl, 4,4'-dicarboxybenzophenone, bis(4-carboxyphenyl)ethane, adipic acid, sebacic acid, 5-sodium sulfoisophthalate, cyclohexane-1,4-dicarboxylic acid, dimer acid and the like; glycol component such as propylene glycol, butanediol, neopentyl glycol, diethylene glycol, cyclohexane dimethanol, ethylene oxide adduct of bisphenol A, polyethylene glycol, polypropylene glycol, polytetramethylene glycol and the like; and oxycarboxylic acid component such as p-oxybenzoic acid. Other copolymerizable components include a compound having amide bond, urethane bond, ether bond, carbonate bond and the like in small amounts.

The above-mentioned polyester can be synthesized by a conventional method such as direct esterification wherein dicarboxylic acid and glycol are directly reacted; ester exchange wherein dimethyl dicarboxylate and glycol are reacted; and the like. These methods may be batch-wise or continuous. Alternatively, solid phase polymerization may be used to increase molecular weight. The solid phase polymerization is advantageous in reducing the cyclic trimer content, as mentioned below. One or more kinds of the polyester(s) synthesized in this way may be added to the polyester composition C.

The polyester composition C has a cyclic trimer (e.g., ethylene terephthalate cyclic trimer) content of preferably not more than 0.7 wt %, more preferably not more than 0.6 wt %, and particularly preferably not more than 0.5 wt %. The cyclic trimer content of preferably not more than 0.7 wt % aims at suppressing the possible precipitation of oligomer in the film. As mentioned later, when a two-piece can is to be produced, a film-laminated metal plate comprising the inventive film is subjected to a remelting treatment to make the film unoriented. An unoriented polyester is more prone to precipitation of oligomer than an oriented polyester. When the unoriented polyester has a high cyclic trimer content and when a two-piece can having this film on the inner wall is filled with a beverage and subjected to heat treatment such as retorting, the oligomer elutes out easily. The eluted oligomer migrates into the beverage and degrades the taste and flavor of the content. In addition, a can having this film on the outer wall loses superior appearance when the oligomer precipitates in the polyester layer C.

The cyclic trimer (e.g., ethylene terephthalate cyclic trimer) content of the polyester composition C is set to 0.7 wt % or less by any method. For example, it may be extracted with water or an organic solvent from a film comprising the polyester layer C. Alternatively, polyester layer C may be formed from a polyester containing less cyclic trimer. Of these, the latter is economically beneficial.

In this latter method, the polyester containing less cyclic trimer may be produced by any method. For example, solid phase polymerization; heat treatment under reduced pressure or extraction with water or an organic solvent after polymerization; a method combining these methods; and the like may be applied. Particularly preferable method comprises producing a polyester containing less cyclic trimer by solid phase polymerization and extracting the resulting polyester with water to reduce cyclic trimer. This method most effectively inhibits production of cyclic trimer during film forming process.

The above-mentioned polyester composition C contains other additives, such as inorganic fine particles, incompatible thermoplastic resin, antioxidant, heat stabilizer, ultraviolet absorber, plasticizer, pigment, antistatic, lubricant, crystal nucleating agent and the like, as long as the above-mentioned requirements are met.

Examples of the lubricant include inert inorganic particles such as silica, alumina, kaoline, clay, titanium oxide, calcium phosphate, calcium carbonate, lithium fluoride, barium sulfate, carbon black and the like. When the lubricant is added to the polyester composition C in a proportion of 0.05–1 wt %, the releasability from the mold during forming can be improved. When the inventive film is used for an outer wall of a metal container, an antioxidant is preferably added to the polyester composition C in a proportion of 0.01–1 wt %.

When the above-mentioned various components are mixed, the polyester composition C preferably has an intrinsic viscosity of 0.6–1.2. When the polyester composition C has an intrinsic viscosity of less than 0.6, the obtained film may have poor mechanical properties and when the intrinsic viscosity exceeds 1.2, the film has excessive quality and the productivity of the starting polyester decreases, which is economically harmful. In the present invention, the intrinsic viscosity was measured by the method to be described below.

The polyester layer on the other side of the inventive polyester laminate film (hereinafter this polyester layer is to be briefly referred to as polyester layer D) is explained in the following. This layer is brought into contact with the metal plate.

The polyester layer D has a melting peak temperature of 180–240° C. and a crystallization peak temperature under temperature rise of the layer of 60–100° C., and consists of a polyester composition D.

The melting peak temperature of 180–240° C. aims at allowing the polyester layer D to melt during production of a film-laminated metal plate, so that the polyester layer D can adhere to the metal plate. The melting peak temperature is preferably 190–230° C., more preferably 200–220° C.

The crystallization peak temperature of the layer under temperature rise is 60–100° C. The crystallization peak temperature of the layer under temperature rise of 60–100° C. aims at inhibiting the generation of bulky crystals (that cause whitening and white spots of the film) even when remelting treatment has been applied, which bulky crystals being attributable to the retorting after can manufacture, like polyester layer C.

For the melting peak temperature and crystallization peak temperature under temperature rise of the polyester layer D to be within the above-mentioned ranges, one or more suitable polyesters may be added from among those to be added to the polyester composition D, to achieve the desired melting peak temperature and crystallization peak temperature, or a polyester containing specific polymerizable components may be added to achieve the desired melting peak temperature and crystallization peak temperature.

The melt peak temperature of the polyester layer D needs to be lower than that of the polyester layer C by 5–25° C. This aims at preventing the polyester layer C from melting when the polyester layer D is melted for the production of a film-laminated metal plate.

The polyester to be contained in the polyester composition D is not particularly limited as long as it satisfies the above-mentioned requirements. Preferred are polyethylene terephthalate copolymer and polybutyrene terephthalate copolymer. Other copolymer components constituting the polyester include dicarboxylic acid component such as isophthalic acid, p-β-oxyethoxybenzoic acid, 2,6-naphthalene dicarboxylic acid, 4,4'-dicarboxydiphenyl, 4,4'-dicarboxybenzophenone, bis(4carboxyphenyl)ethane, adipic acid, sebacic acid, 5-sodium sulfoisophthalate, cyclohexane-1,4-dicarboxylic acid, dimer acid and the like; glycol component such as propylene glycol, butanediol, neopentyl glycol, diethylene glycol, cyclohexane dimethanol, ethylene oxide adduct of bisphenol A, polyethylene glycol, polypropylene glycol, polytetramethylene glycol and the like; and oxycarboxylic acid component such as p-oxybenzoic acid. Other copolymerizable components include a compound having amide bond, urethane bond, ether bond, carbonate bond and the like in small amounts.

The synthetic method of the above-mentioned polyester, additives for polyester composition D on demand, intrinsic viscosity of polyester composition D, and the like may be those described with regard to polyester composition C.

In the inventive film, polyester layer C preferably has a thickness of 3–20 $\mu$m and polyester layer D preferably has a thickness of 3–20 $\mu$m. When the polyester layer C has a thickness of less than 3 $\mu$m, the film cannot show sufficient releasing property from a punch during drawing and the like. When the polyester layer D has a thickness of less than 3 $\mu$m, the film cannot show sufficient adhesive property. The film as a whole preferably has a thickness of 10–40 $\mu$m.

The inventive film need only be a laminate wherein one surface layer is the polyester layer C, and the other surface layer is the polyester layer D. It may not have a two-layer structure. Polyester layers having similar compositions to the polyester layer C and the polyester layer D, or different compositions may be further laminated between the polyester layer C and the polyester layer D to form a multi-layer structure. The method of lamination is subject to no particular limitation and multi-layer extrusion or extrusion lamination may be employed.

The inventive film as a whole preferably has a crystallization peak temperature under temperature rise of 60–100° C., not only when the polyester layer C and polyester layer D form a two-layer structure, but multi-layer structure. This temperature range aims at prevention of whitening and white spots of the film, which are caused by retorting.

The film of the present invention may be a biaxially oriented film or unoriented film. The method for biaxial orientation here may be a sequential biaxial orientation, simultaneous biaxial orientation, or a combination of the both. The sequential biaxial orientation typically employs longitudinal orientation and then transverse orientation, but the order may be reversed. After biaxial orientation, heat treatment is preferably applied to fix the orientation of the polyester. After biaxial orientation and before heat treatment, drawing may be applied again in the longitudinal direction and/or transverse direction. In addition, corona discharge treatment or predetermined coating may be applied to one or both sides of a film, before or after drawing.

The film of the present invention preferably shows shrink performance of the film as a whole of 0–3 g/4 mm. A biaxially oriented film also preferably has shrink performance in this range. When the shrink performance that the film potentially possesses is high and the film is used to give a film-laminated metal plate, the film may shrink to cause delamination upon remelting treatment, or, when adhesion of polyester layer D to metal plate is sufficient, only the polyester layer C which does not come into contact with the metal plate may be dislocated (i.e., film deviation).

The shrink performance of a film is made to fall within the aforementioned range by heat treatment while relaxing the film (for fixing orientation after drawing) at (melting peak temperature −20)° C. in a film forming process. In the present invention, the shrink performance of a film is measured by the method to be mentioned later.

The film-laminated metal plate of the present invention comprises a metal plate and the inventive film laminated on the metal plate in such a manner that the polyester layer D comes into contact with the metal plate. The polyester layer D having adhesive property comes into contact with the metal plate. As a result, the film shows superior adhesion to the metal plate.

The film can be laminated on a metal plate by any method. For example, dry lamination, thermal lamination and the like may be employed. To be specific, the polyester layer D of the film is placed on a metal plate heated to a temperature at which the polyester layer D melts and the polyester C does not. The plate with the film is passed through a nip roll in this state to allow the polyester layer D to melt. Then, the film is rapidly cooled at 10–40° C. to cure and to be laminated on the metal plate. After passage through a nip roll, the film may be heat treated as necessary at a temperature at which the polyester layer D melts.

The film may be laminated only on one surface of the metal plate or both. For lamination on both sides, simultaneous or successive lamination may be applied.

When the film-laminated metal plate of the present invention is to be formed into a two-piece can, the film is laminated on a metal plate, heated to a temperature not less than the melting point of the polyester constituting the film, and rapidly cooled to remove orientation of the polyester (remelting treatment). The orientation degree of the polyester in the film after remelting treatment by X-ray observation becomes not more than 10%, and the film is substantially unoriented. A biaxially oriented film comprising an oriented polyester does not deform or stretch easily. Hence, when the film laminated on a metal plate is a biaxially oriented film, the drawing step for forming a container part from the film-laminated metal plate becomes difficult In a worst imaginable case, the film may be peeled off from the metal plate (delamination) or broken or scraped off during draw-wipe forming. When the film laminated on the metal plate is substantially unoriented, the film can follow deformation of the metal plate, so that the film is free of delamination or breakage. The film is therefore applicable to molding accompanying plastic deformation of a metal, such as manufacture of a two-piece can.

An unoriented film generally has lower strength and is susceptible to precipitation of oligomer and whitening, as compared to biaxially oriented films. However, the unoriented film of the present invention has sufficient strength free from breakage or scratch and is free of precipitation of oligomer and whitening.

The film-laminated metal container of the present invention is obtained by appropriately forming the above-mentioned film-laminated metal plate comprising an unoriented film. The shape of the container and the method for forming same are subject to no particular limitation. Specifically, the container may be a so-called three-piece can obtained by forming the film-laminated metal plate into a cylindrical shape and seaming lids on the upper and lower openings of this cylinder, or a two-piece can obtained by drawing the film-laminated metal plate to form a container part and seaming a lid onto the upper opening of this container.

With respect to the film-laminated metal container of the present invention, the film-laminated metal plate may be so formed as to have the film constituting the inner wall or outer wall of the container. In particular, the inventive film is free of precipitation of oligomer and whitening of the film, which are caused by retorting treatment when remelting treatment has been applied, so that it is preferably used for the outer wall of a container that is required to have superior appearance.

In the case of draw-wipe forming, the film surface to be in contact with the punch may be coated with a lubricant as necessary. When a lubricant is applied, the lubricant needs to be removed by evaporation, washing and the like after forming.

In the film-laminated metal container of the present invention, moreover, the film constituting the barrel part of the container has been monoaxially oriented in the longitudinal direction, due to drawing for forming the container, even when a film-laminated metal plate comprising an unoriented film after remelting treatment is used.

The film-laminated metal container of the present invention may be printed as necessary. When printed, the same effect as achieved by remelting treatment can be afforded by baking of the ink. Therefore, orientation that occurred due to draw-wipe forming, as evidenced in the barrel part of a two-piece can, can be eliminated and the film can be restored to the unoriented state after the printing step.

When the film is oriented like a two-piece can immediately after drawing, a remelting treatment by printing and the like is preferably applied. The film-laminated metal container preferably has a polyester orientation degree of the film of not more than 10% by an X-ray observation.

<Measurement method>

1. Crystallization peak temperature when the film (layer) is under temperature rise A sample was melted by heating at 300° C. for 5 minutes and rapidly cooled with liquid nitrogen. Using differential scanning calorimeter, the temperature peak of exotherm produced by crystallization was measured while heating 10 mg thereof at a temperature elevating rate of 10° C./min. The obtained value was taken as a crystallization peak temperature when the film (layer) is under temperature rise.

2. Melting peak temperature

A sample was melted by heating at 300° C. for 5 minutes and rapidly cooled with liquid nitrogen. Using differential scanning calorimeter, the temperature peak of absorption caused by melting of crystals was measured while heating 10 mg thereof at a temperature elevating rate of 10° C./min. The obtained value was taken as a melting peak temperature.

3. Intrinsic viscosity

A sample was dissolved in a mixed solvent of phenol/tetrachloroethane (6/4 weight ratio) at a concentration of 0.4 g/dl, and intrinsic viscosity was measured using an Ubbelohde's viscometer at 30° C.

4. Degree of orientation of film by X-ray observation

A film before lamination, a film-laminated metal plate after remelting treatment and a film-laminated metal container after retorting were examined for diffraction curves using RINT type X-ray diffraction apparatus (manufactured by Rigaku) under the conditions of electrode Cu, tube voltage 40 kV and tube current 35 mA. The ratio of peak height in the range of 2θ=20°–30° to that of the film before lamination was taken as the degree of orientation.

5. Shrink performance of film

Load curves of the samples cut in width 4 mm×length 20 mm were obtained using a heat machine analyzer at sample holder interval 10 mm, initial load 5 gf, temperature elevation at 10° C./min from 30° C., and the maximum shrink performance was obtained therefrom.

EXAMPLE 1

[Preparation of polyester laminate film]

As the starting material of polyester layer A, polyester composition A was used, which comprised polyethylene terephthalate (50 wt %) comprising crosslinked spherical polymethyl methacrylate (5 wt %, average particle size 2 μm), coagulation type silica particles (0.3 wt %, avenge particle size 1.5 μm) and ethyleneterephthalate cyclic trimer (0.4 wt %), which had an intrinsic viscosity of 0.7, and which was obtained by low oligomerization under a high temperature nitrogen atmosphere, and polybutylene terephthalate (50 wt %) having an intrinsic viscosity of 1.4, which was afforded an increased molecular weight under a solid phase treatment in vacuo after polymerization. The polyester composition A had an intrinsic viscosity of 0.75.

As the starting material of polyester layer B, polyester composition B was used, which comprised a polyester consisting of a dicarboxylic acid component comprising a terephthalic acid unit (90 mol %) and a $C_{36}$ dimer acid unit (10 mol %), and a diol component comprising an ethylene glycol unit (70 mol %) and a butanediol unit (30 mol %). The polyester composition B had an intrinsic viscosity of 0.82.

Composition A and composition B were melted in separate extruders and the melted compositions were mixed in a die, extruded and rapidly cooled to give an unoriented laminate sheet This unoriented laminate sheet was drawn 3.3 times in the longitudinal direction at preheating temperature of 65° C., drawing temperature of 100° C., and 4.0 times in the transverse direction at preheating temperature of 65° C., drawing temperature of 90° C. in a tenter, followed by heat treatment at 210° C. for 8 seconds and 5% relaxing treatment at 190° C., to give a biaxially oriented laminate film having a thickness of 20 μm (thickness of polyester layer A, 10 μm, thickness of polyester layer B, 10 μm). This film had a crystallization peak temperature of 88° C. when the film was under temperature rise, polyester layer A had a crystallization peak temperature of 82° C. when the layer A was under temperature rise, and polyester layer B had a crystallization peak temperature of 98° C. when the layer B was under temperature rise. The shrink performance of the film was 2.2 g/4 mm.

[Preparation of film-laminated metal plate]

The polyester laminate films prepared in the above were placed on both surfaces of a preheated tin free steel in such a manner that polyester layer B came into contact with the metal plate and passed through a nip roll, to give a steel plate laminated with the film on one sides. During laminating, initial adhesive properties, variation in tension or winding around the nip roll were not observed, and the film of this Example had fine laminating property. This film-laminated steel plate was subjected to remelting treatment (rapid cooling in water tank at 10–40° C. after heat treatment). The film had an orientation degree of 5% by an X-ray observation.

[Preparation of film-laminated metal container]

The steel plate laminated with the film on both sides prepared in the above was subjected to draw-wipe forming to constitute an inner wall of the container with the film (plate thickness decrease 30%), whereby a film-laminated metal container was formed. During forming, peeling off or breakage of the film was not observed and the releasing property from the mold was fine. After printing on the outside surface, it was varnished and heat cured, followed by raid cooling with cold air.

The container thus formed was filled with a soft drink and a lid with a pull tab was seamed thereon. The container was retorted at 125° C. for 30 minutes to give a two-piece drink can. In the can, the film had an orientation degree of 3% by X-ray observation, and was free of whitening or white spots produced by retorting. The precipitation of oligomer in the film and elution of the oligomer into the drink from the film were void. Moreover, the film was free of breakage or influence on the content as a result of the impact from the outside which is predictable during distribution process, and the can had sufficient property as a beverage can.

EXAMPLE 2

[Preparation of laminate polyester film]

As the starting material of polyester layer C, polyester composition C was used, which comprised polyethylene terephthalate (20 wt %) comprising coagulation type silica particles (0.5 wt %, average particle size 1.5 μm) and ethyleneterephthalate cyclic trimer (0.4 wt %), which had an intrinsic viscosity of 0.7, and which was obtained by low oligomerization under a high temperature nitrogen atmosphere, and polybutyrene terephthalate (80 wt %) having an intrinsic viscosity of 1.4, which was afforded an increased molecular weight by a solid phase treatment in vacuo after polymerization. The polyester composition C had an intrinsic viscosity of 0.92.

As the starting material of polyester layer D, polyester composition D was used, which comprised a polyester consisting of a dicarboxylic acid component comprising a terephthalic acid unit (85 mol %) and an isophthalic acid unit (15 mol %), and a diol component comprising an ethylene glycol unit (35 mol %) and a butanediol unit (65 mol %). The polyester composition D had an intrinsic viscosity of 0.78.

The composition C and composition D were melted in separate extruders and the melted compositions were mixed in a dye, extruded and rapidly cooled to give an unoriented laminate sheet.

This unoriented laminate sheet was drawn 3.3 times in the longitudinal direction at preheating temperature of 65° C., drawing temperature of 100° C., and 4.0 times in the transverse direction at preheating temperature of 65° C., drawing temperature of 90° C. in a tenter, followed by heat treatment at 210° C. for 8 seconds and 5% relaxing treatment at 190° C., to give a biaxially oriented laminate film having a thickness of 12 μm (thickness of polyester layer C, 6 μm, thickness of polyester layer D, 6 μm). This film had a crystallization peak temperature of 72° C. when the film was under temperature rise; polyester layer C had a melting peak temperature of 228° C. and a crystallization peak temperature of 63° C. when the layer C was under temperature rise; and polyester layer D had a melting peak temperature of 208° C. and a crystallization peak temperature of 88° C. when the layer D was under temperature rise. The shrink performance of the film was 0.8 g/4 mm.

[Preparation of film-laminated metal plate]

The polyester laminate film prepared in the above was placed on one surface of a preheated aluminum alloy plate in such a manner that polyester layer D came into contact with the metal plate and passed through a nip roll, to give an aluminum alloy plate laminated with the film on one side. During lamination, initial adhesive properties, variation in tension or winding around the nip roll were not observed, and the film of this Example had fine laminating property. This film-laminated aluminum alloy plate was subjected to remelting treatment (rapid cooling in water tank at 10–40° C. after heat treatment). The film had an orientation degree of 5% by an X-ray observation.

[Preparation of film-laminated metal container]

The film-laminated aluminum alloy plate prepared in the above was subjected to draw-wipe forming to constitute an outer wall of the container with the film (plate thickness decrease 55%), whereby a film-laminated metal container was formed. During forming, peeling off or breakage of the film was not observed and the releasing property from the mold was fine. After printing on the outside surface of the film-laminated barrel part, it was varnished and heat cured, which was followed by rapid cooling with cold air.

The container thus formed was filled with a soft drink and a lid with a pull tab was seamed thereon. The container was retorted at 125° C. for 30 minutes to give a two-piece drink can. In the can, the film had an orientation degree of 4% by X-ray observation, and the outer wall of the drink can was free of whitening or white spots due to retorting.

The polyester laminate film of the first embodiment of the present invention has a lower crystallization peak temperature when the film is under temperature rise, as compared to conventional polyethylene terephthalate. As a consequence, the film is free of whitening upon retorting, even after the film is subjected to remelting treatment and rapid cooling for noncystallization and unorienting. Therefore, the film serves well as a laminate film for food containers and beverage cans that undergo retort sterilization. Inasmuch as the polyester layer on one surface contains a large amount of a lubricant and has releasing property, the film serves well as a laminate film for a metal plate, which is required to have releasing property from a mold during manufacture of containers such as a two-piece can. The polyester layer on the other surface contains a large amount of dimer acid and the film is superior in impact resistance. Hence, the film serves well as a laminate film for a metal container which is susceptible to damage due to impact during distribution process.

In the film-laminated metal plate after remelting treatment, the film is substantially unoriented and capable of following plastic deformation of metal plate. Hence, the film serves well as a laminate film for a metal plate associated with such processing.

In the film-laminated metal plate of the present invention, the film is superior in adhesive properties to a metal plate. Thus, the plate can undergo molding and heat treatment. In particular, since the surface free form contact with a metal plate consists of a polyester layer having superior releasing property, it is suitably used in processing, such as drawing, that requires releasing property from a mold such as a punch.

The film-laminated metal container of the present invention is free of whitening or precipitation of oligomer possibly caused by retorting after manufacture of containers and packing of food, and is superior in impact resistance and adhesive properties. This is attributable to the properties of the laminated film, and the film can be suitably used for the outer wall of a container that requires good appearance, as well as the inner wall of a container that requires no influence on the flavor or taste of the content.

The polyester laminate film which is the second embodiment of the present invention has a lower crystallization peak temperature when the film is under temperature rise, as compared to conventional polyethylene terephthalate. As a consequence, the film is free of whitening upon retorting, even after the film is subjected to remelting treatment and rapid cooling for noncystallization and unorienting. Therefore, the film serves well as a laminate film for food containers and beverage cans that undergo retort sterilization. The polyester layer on the other side melts and can adhere directly to a metal plate while exhibiting superior adhesive properties.

Inasmuch as the film laminated on the metal plate after remelting treatment is substantially unoriented, the film can follow plastic deformation of a metal plate and the film is applicable as a film to be laminated on a metal plate that undergoes such processing.

In the film-laminated metal plate of the present invention, the film is superior in adhesive properties to a metal plate, so that it can be applied to molding and heat treatment The film-laminated metal container of the present invention is free of whitening or precipitation of oligomer possibly caused by retorting after manufacture of containers and packing of food. This is attributable to the property of the laminated film, and the film is suitably used for the outer wall of a container that requires good appearance.

What is claimed is:

1. A polyester laminate film comprising plural polyester layers, which comprises one polyester surface layer having a melting peak temperature of 200–260° C. and a crystallization peak temperature of 60–100° C. under temperature rise of the layer, and the other polyester surface layer having a melting peak temperature of 180–240° C. and a crystallization peak temperature of 60–100° C. under temperature rise of the layer, wherein the melting peak temperature of said one polyester surface layer is higher by 5–25° C. than the melting peak temperature of said other polyester surface layer.

2. The polyester laminate film of claim 1, which has been biaxially oriented.

3. A film-laminated metal plate comprising a metal plate and the polyester laminate film of claim 1 or claim 2 laminated on the metal plate in such a manner that said other surface layer of the film is in contact with the metal plate.

4. The film-laminated metal plate of claim 3, wherein the film has an orientation degree of not more than 10%.

5. A film-laminated metal container obtained by forming the film-laminated metal plate of claim 4 in such a manner that the film constitutes an outer wall of the film-laminated metal container.

6. A film-laminated metal container obtained by forming the film-laminated metal plate of claim 3 in such a manner that the film constitutes an outer wall of the film-laminated metal container.

7. The film-laminated metal container of claim 6, wherein the film has an orientation degree of not more than 10%.

8. The film-laminated metal container of claim 6, which is a two-piece metal can.

9. A film-laminated metal container comprising a metal container and the polyester laminate film of claim 1 or claim 2, said film being laminated on the outer wall of the metal container in such a manner that said other surface layer of the film is in contact with the metal container.

10. The film-laminated metal container of claim 9, wherein the film has an orientation degree of not more than 10%.

11. The film-laminated metal container of claim 10, which is a two-piece metal can.

12. The film-laminated metal container of claim 9, which is a two-piece metal can.

* * * * *